United States Patent
Balan et al.

(10) Patent No.: US 7,218,741 B2
(45) Date of Patent: May 15, 2007

(54) SYSTEM AND METHOD FOR ADAPTIVE MULTI-SENSOR ARRAYS

(75) Inventors: Radu Victor Balan, West Windsor, NJ (US); Justinian Rosca, Princeton, NJ (US); Liang Hong, Plainsboro, NJ (US); Volkmar Hamacher, Neunkirchen (DE); Eghart Fischer, Schwabach (DE)

(73) Assignee: Siemens Medical Solutions USA, Inc, Malvern, PA (US)

( * ) Notice: Subject to any disclaimer, the term of this patent is extended or adjusted under 35 U.S.C. 154(b) by 722 days.

(21) Appl. No.: 10/454,849

(22) Filed: Jun. 4, 2003

(65) Prior Publication Data

US 2004/0001598 A1    Jan. 1, 2004

Related U.S. Application Data

(60) Provisional application No. 60/386,761, filed on Jun. 5, 2002.

(51) Int. Cl.
*H04R 3/00* (2006.01)

(52) U.S. Cl. .......................... 381/92; 381/111; 708/801
(58) Field of Classification Search .................. 381/92, 381/111, 122; 708/801
See application file for complete search history.

(56) References Cited

U.S. PATENT DOCUMENTS

| | | | |
|---|---|---|---|
| 6,584,203 B2 * | 6/2003 | Elko et al. ..................... | 381/92 |
| 6,594,367 B1 * | 7/2003 | Marash et al. ................. | 381/92 |
| 6,603,861 B1 * | 8/2003 | Maisano et al. ............... | 381/92 |
| 6,937,980 B2 * | 8/2005 | Krasny et al. ............... | 704/231 |

* cited by examiner

*Primary Examiner*—Vivian Chin
*Assistant Examiner*—Con P. Tran
(74) *Attorney, Agent, or Firm*—Donald B. Paschburg; F. Chau & Associates, LLC

(57) ABSTRACT

An adaptive differential microphone array method comprises receiving a signal, estimating a measured signal spectral covariance matrix of the signal, and estimating a direction of arrival of the signal based on the measured signal spectral covariance matrix of the signal. The method further comprises determining a fractional delay, and applying a differential microphone array filter to the signal based on the direction of arrival and the fractional delay.

11 Claims, 4 Drawing Sheets

SYSTEM AND METHOD FOR ADAPTIVE MULTI-SENSOR ARRAYS

The present invention claims priority to U.S. Provisional Application No. 60/386,761, filed Jun. 5, 2002, which is herein incorporated by reference in its entirety.

BACKGROUND OF THE INVENTION

1. Field of the Invention

The present invention relates to signal processing, and more particularly to an adaptive multi-sensor array and method thereof.

2. Discussion of the Related Art

Microphone arrays are used in various devices, such as hearing aids and speech recognition applications. One problem with these devices is noise, and the elimination of noise from a signal received by the microphone array. In the field of hearing aids, there exist several proposed solutions. The proposed solutions can be divided into three classes of microphone array schemes: side-lobe canceller, beamformer, and differential microphone array (DMA). Many of the known adaptive methods for reducing noise address the first two classes, side-lobe cancellers and beamformers. However, few works address the adaptability of the differential microphone array scheme.

Two works that discuss differential microphone arrays are H. Teutsch and G. W. Elko, "First and second-order adaptive differential microphone arrays", $7^{th}$ *International Workshop on Acoustic Echo and Noise Control*, pages 35–38, 2001; and U.S. Pat. No. 5,473,701 to J. Cezanne and G. W. Elko entitled "Adaptive Microphone Array". The differential microphone array works implement an adaptation by minimizing an output variance.

The proposed solutions implementing differential microphone arrays utilize an optimization criterion, which is a total output power or energy. The criterion is of the form T1+T2 where T1 is the output energy due to the signal, and T2 the output energy due to the noise. Thus, the optimization problem is: min(T1+T2)

This optimization problem has an inherent limitation; when the source position is in a null-allowed region, then either no processing is done, or if the optimization problem is solved, it cancels a target source.

Similarly, a directivity index of the prior art differential microphone array work is always maximal for theta=0. Thus, it is an end-fire array and there is no adaptability when the source moves.

Additionally, a parameter beta is implemented that adjusts the directivity pattern.

Therefore, a need exists for an adaptive multi-sensor array.

SUMMARY OF THE INVENTION

According to an embodiment of the present invention, an adaptive differential microphone array method comprises receiving a signal, estimating a measured signal spectral covariance matrix of the signal, and estimating a direction of arrival of the signal based on the measured signal spectral covariance matrix of the signal. The method further comprises determining a fractional delay, and applying a differential microphone array filter to the signal based on the direction of arrival and the fractional delay.

The signal is a sample.

Determining the fractional delay comprises obtaining the fractional delay from a look-up table based on the direction of arrival through a maximization of a weighted directivity index, and applying the fractional delay in the differential microphone array filter.

According to an embodiment of the present invention, an adaptive differential microphone array method comprises receiving a signal, and estimating a measured signal spectral covariance matrix of the signal, and estimating a direction of arrival of the signal. The method further comprises determining a presence of a source of interest in the signal based on the direction of arrival of the signal, a noise spectral covariance matrix of the signal, and a source signal spectral power of the signal, estimating the noise spectral covariance matrix based on a determination of the presence of the source of interest and the measured signal spectral covariance matrix of the signal. The method comprises estimating a source signal spectral power of the signal according to the presence of the source of interest the noise spectral covariance matrix and the noise spectral covariance matrix, and applying a differential microphone array filter to signal according to the direction of arrival, the noise spectral covariance matrix, and the source signal spectral power of the signal.

The signal is a sample.

The method further comprising determining a fractional delay, and applying the fractional delay in the differential microphone array filter.

Determining the two fractional delays further comprises determining $(\tau_1,\tau_2)=\text{argmax}_{d1,d2}I(d_1,d_2)$.

According to an embodiment of the present invention, a digital processor for reducing a noise portion of a signal comprises means for estimating a measured signal spectral covariance matrix of the signal, means for estimating a direction of arrival of the signal, and a differential microphone array filter.

The digital processor further comprises a voice activity detector outputting a signal indicating the presence of a source of interest in the signal, means for estimating a noise spectral covariance matrix based on the signal indicating the presence of a source of interest in the signal and the measured signal spectral covariance matrix, and means for estimating a source signal spectral power of the signal according to the noise spectral covariance matrix, and the measured signal spectral covariance matrix.

According to an embodiment of the present invention, a program storage device is provided readable by machine, tangibly embodying a program of instructions executable by the machine to perform method steps for an adaptive differential microphone array method. The method steps comprising receiving a signal, estimating a measured signal spectral covariance matrix of the signal, and estimating a direction of arrival of the signal based on the measured signal spectral covariance matrix of the signal. The method further comprising determining a fractional delay, and applying a differential microphone array filter to the signal based on the direction of arrival and the fractional delay.

According to an embodiment of the present invention, a program storage device readable by machine, tangibly embodying a program of instructions executable by the machine to perform method steps for an adaptive differential microphone array method. The method steps comprise receiving a signal, estimating a measured signal spectral covariance matrix of the signal, and estimating a direction of arrival of the signal. The method further comprises determining a presence of a source of interest in the signal based on the direction of arrival of the signal, a noise spectral covariance matrix of the signal, and a source signal spectral power of the signal, and estimating the noise spectral covariance matrix based on a determination of the presence of the source of interest and the measured signal spectral covariance matrix of the signal. The method comprises estimating a source signal spectral power of the signal according to the presence of the source of interest the noise spectral covariance matrix and the noise spectral covariance matrix, and applying a differential microphone array filter to signal according to the direction of arrival, the noise spectral covariance matrix, and the source signal spectral power of the signal.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

According to an embodiment of the present invention, a system and method for adaptive array signal processing for multi-sensor arrays estimates a direction of arrival (DOA) of a main source. Upon determining an estimated direction of arrival of the main source, a differential microphone array (DMA) is adapted using parameters taken from a predetermined look-up table. According to an embodiment of the present invention, the differential microphone array filter parameters are tuned using an estimate of the direction of arrival of the main source, an estimate of a source spectral power, and an estimate of a noise field spectral covariance matrix. Thus, an improved recorded audio signal is obtained as compared to a recording made using one microphone.

According to an embodiment of the present invention, an adaptive multi-sensor array can be implemented in a hearing aid. However, adaptive multi-sensor arrays are not limited to hearing aids, and can be applied to any microphone array based audio processing system, such as for improving the quality of a voice in a car environment, or the quality of a patient voice while in a gantry of a CT scanner.

An estimate of the direction of arrival of a dominant source is obtained, as well as the source spectral power, and the noise field spectral covariance matrix. Based on the estimates of the direction of arrival of the dominant source, the source spectral power, and the noise field spectral covariance matrix a differential microphone array scheme can be adapted to reduce a noise level in a recorded signal.

Figure 1:
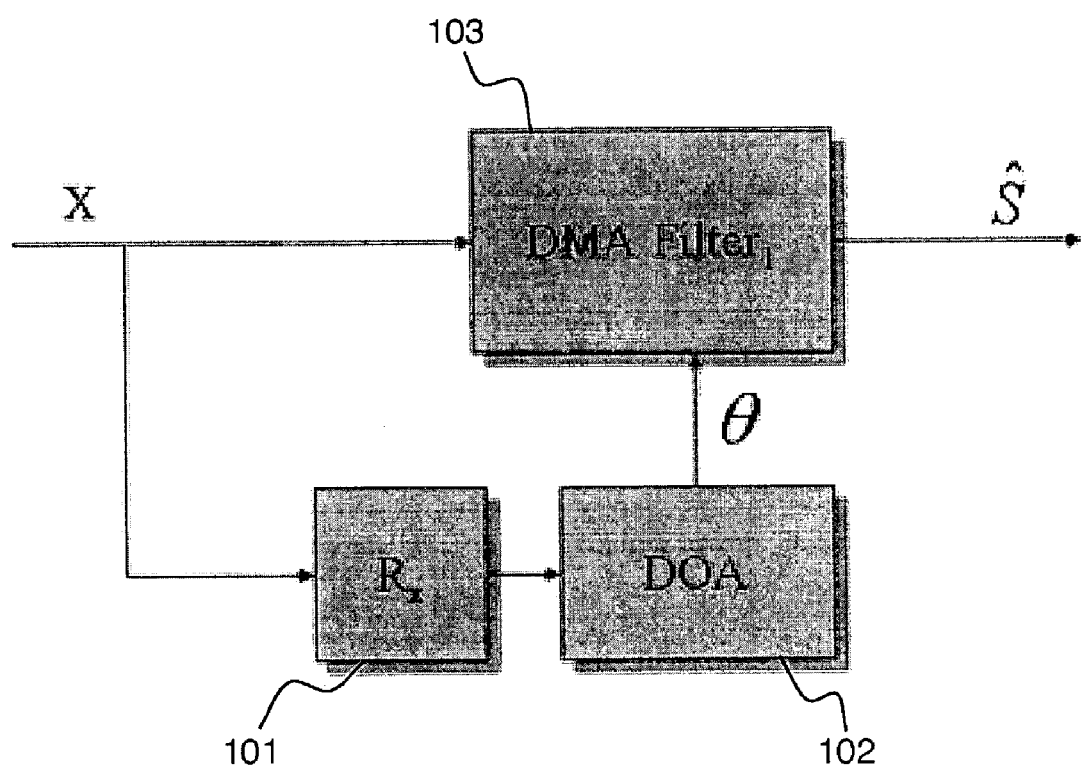
FIG. 1 is an illustration of a direction of arrival based adaptive differential microphone array according to an embodiment of the present invention.
Figure 2:
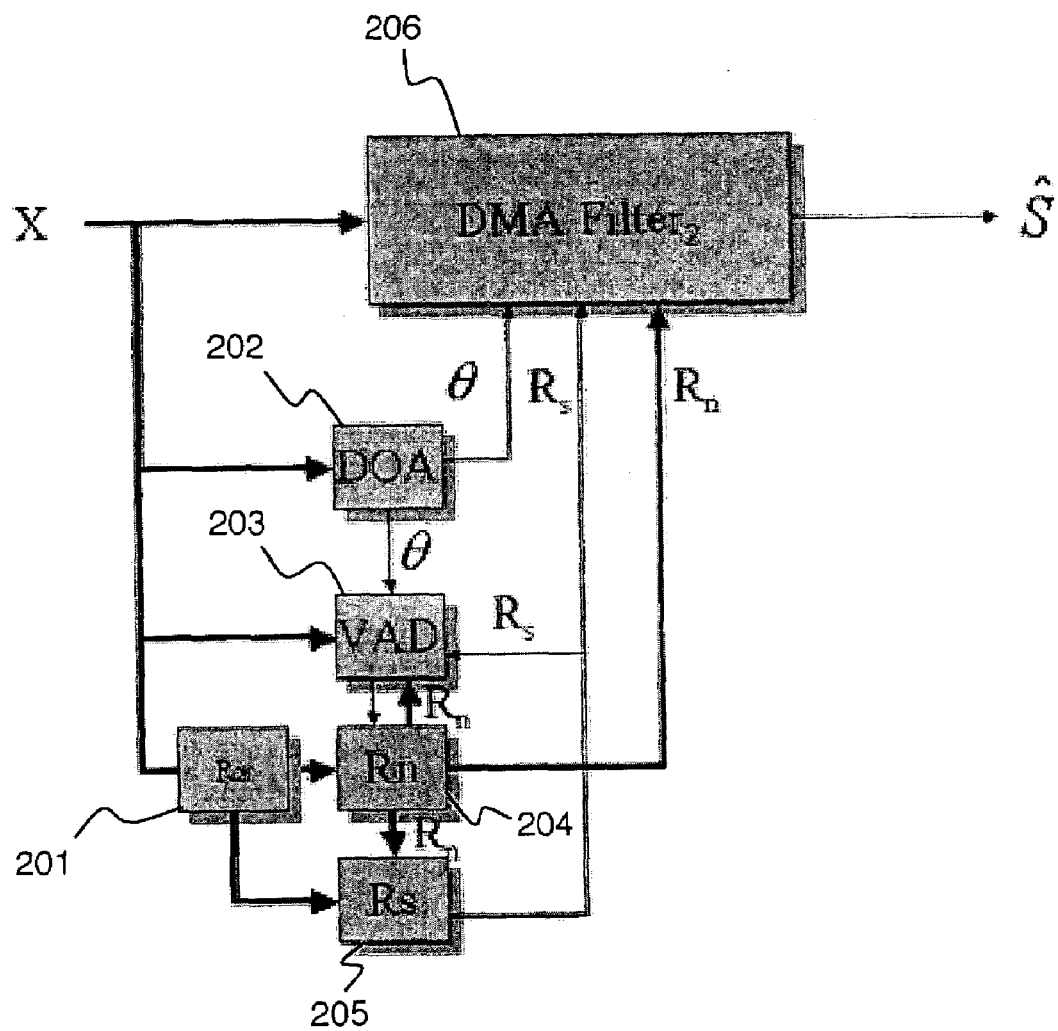
FIG. 2 is an illustration of a voice activity detector and direction of arrival based adaptive differential microphone array system according to an embodiment of the present invention.

Referring to FIG. 1, a direction of arrival based adaptive differential microphone array method is shown. Referring to FIG. 2, a voice activity detector (VAD) and direction of arrival based adaptive differential microphone array method is depicted.

As shown in FIG. 1, in the direction of arrival based adaptive differential microphone array, the differential microphone array filter coefficients are updated from a look-up table based on the current estimate of direction of arrival. In the voice activity detector and direction of arrival based adaptive differential microphone array shown in FIG. 2, the differential microphone array filter coefficients are obtained as optimizers of a modified directivity index that takes into account the estimated source direction of arrival, as well as the current estimate of the noise spectral covariance matrix and source spectral power.

Figure 3:
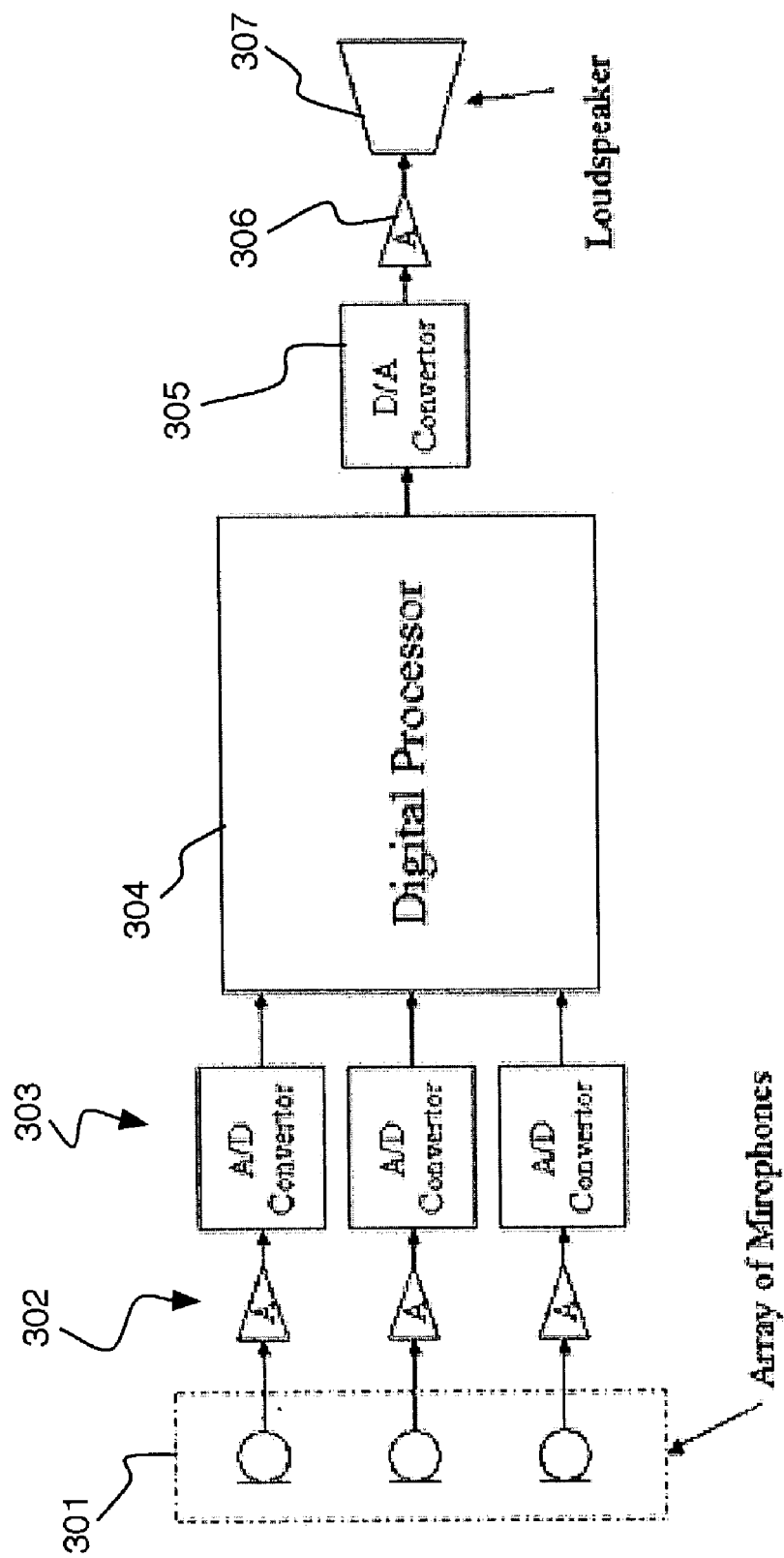
FIG. 3 is an illustration of an adaptive microphone array according to an embodiment of the present invention.

A system for implementing the methods of FIG. 1 and FIG. 2 is shown in FIG. 3. Referring to FIG. 3, the array of microphones 301 converts an acoustic pressure into an electric signal. The electric signal is amplified by amplifiers A 302 and converted into a digital domain by the analog-to-digital (A/D) converters 303. The digitized measured signals can be denoted by $x_1, \ldots x_D$, where D is the number of microphones. The signal in the digital domain is processed by a digital processor 304, described with respect to FIGS. 1 and 2. A processed signal is converted back into the analog domain by a digital-to-analog (D/A) converter 305. The signal is amplified by amplifier 306 and converted into a pressure wave by the loudspeaker 307.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
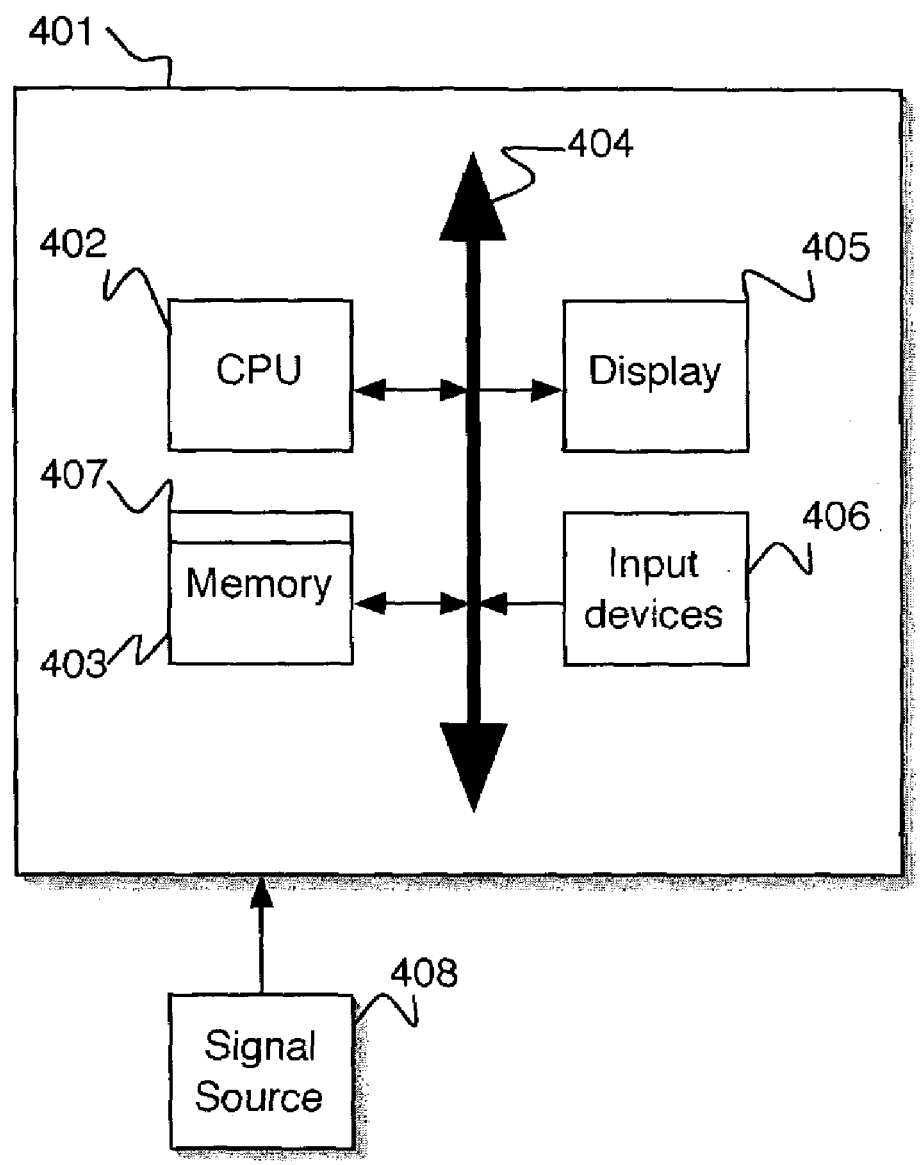
FIG. 4 is an illustration of a system according to an embodiment of the present invention.

Referring to FIG. 4, according to an embodiment of the present invention, a computer system 401 for implementing the present invention can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. As such, the computer system 401 is a general purpose computer system that becomes a specific purpose computer system when executing the routine 407 of the present invention.

The computer platform 401 also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Referring to FIG. 1, the direction of arrival based adaptive differential microphone array method comprises three blocks: estimation of the measured signal spectral covariance matrix $R_x$ 101, estimation of direction of arrival 102, and differential microphone array filter, Filter1 103.

The estimation of the measured signal spectral covariance matrix $R_x$ 101 comprises initializing $R_x$ for every frequency. The initialization can be written as:

$$R_x(\omega) = 0, \text{ for } M \text{ values of } \omega, \omega \in S = \left\{0, \frac{2\pi}{M}, \ldots, \frac{2\pi(M-1)}{M}\right\}$$

where M is a number of samples. The initialization can be, for example, to zero (0). For each input, X, a windowed Fourier transform is determined. For example, for a three-microphone array, the windowed Fourier transform can be determined using the last M samples $x_1(t), x_1(t-1), \ldots, x_1(t-M+1), x_2(t), x_2(t31\ 1), \ldots, x_2(t-M+1), x_3(t), x_3(t-1), \ldots, x_3(t-M+1)$ where the transform is written as:

$$X_x(\omega) = \sum_{l=0}^{M-1} w(l)x(t-1)e^{-i\omega l}, k = 1,2,3, \omega = 0, \frac{2\pi}{M}, \ldots, \frac{2\pi(M-1)}{M}$$

where $w(0), \ldots, w(M-1)$ is the window, and for every $\omega \in S$ ($\omega$ is called frequency). $R_x$ is updated at every frequency. The updated $R_x$ is based on a previous frame and a present frame.

Various direction of arrival estimation techniques can be used. For example, set $\tau = df_s/c$, where d is the distance between two adjacent microphones, $f_s$ is the sampling frequency, and c is the speed of sound. For $k = -N, -N+1, \ldots, N$ determine $$F(k) = \sum_{\omega \in S} V(\omega) R_x(\omega) V(\omega)^*$$

where $v(\omega) = [1 \ e^{-i\omega\tau k/N} \ e^{-2i\omega\tau k/N}]$;

The maximum of F is determined as:

$k_{max} = \text{argmax}_{k=-N,-N+1,\ldots,N} F(k)$

A fractional delay, $\hat{\delta}$, and the direction of arrival estimate are determined as:

$$\hat{\delta} = \frac{k_{max}\tau}{N}$$

$$\hat{\theta} = \arccos\left(\frac{k_{max}}{N}\right)$$

The fractional delay measures the time it takes between when a sound arrives at a first microphone and when the sound arrives at a second microphone.

The differential microphone array filter is used to determine the measured signals for each input, $x_D$. According to an embodiment of the present invention, the differential microphone array uses parameters $\tau_1, \tau_2$ obtained from a look-up table. The look-up table determines delays $d_1, d_2$ for each estimated direction of arrival. The look-up table gives a list of $\tau_1, \tau_2$ in an optimization cost criterion $J(d_1, d_2)$.

The parameters $\tau_1, \tau_2$, e.g., optimized values of $d_1, d_2$, depend on the direction of arrival through a maximization of a weighted directivity index. The directivity index suppresses certain directions and amplifies others. Suppressed directions include those directions from which noise originates. Amplified directions include those with a source of interest.

An aligned signal is determined based on two or more signals received at corresponding sensors. The two or more signals are aligned using the values for fractional delays $\tau_1$, $\tau_2$. The parameters $\tau_1, \tau_2$ depend on the direction of arrival through a maximization of a weighted directivity index.

The optimization cost criterion $J(d_1, d_2)$ be given by a weighted average of frequency dependent normalized signal-to-noise ratios is determined. The optimization cost criterion takes into account where $v = [1 - e^{i\omega d_1} - e^{i\omega d_2} e^{i\omega(d_1+d_2)}]$ $\hat{\delta}$ obtained in the direction of arrival estimation, a weight, e.g., an articulation index, and a matrix for determining a spectral power of noise in a diffuse noise environment. The parameters $\tau_1, \tau_2$ are obtained as:

$(\tau_1, \tau_2) = \text{argmax}_{d_1, d_2} J(d_1, d_2)$.

Referring to FIG. 2, the voice activity detector and direction of arrival based adaptive differential microphone array method comprises an estimation of $R_x$ 201, an estimation of the direction of arrival 202, a voice activity detector 203, an estimation of $R_n$ 204, an estimation of $R_s$ 205, and a differential microphone array filter, Filter2 206.

Known voice activity detectors can be used. The voice activity detector discriminates between speech and non-speech, and can discard non-speech portions of a signal. The voice activity detector 203 outputs a binary signal: 0 or 1, 0 when a source of interest is not present, and 1 when a source of interest is present.

Based on the voice activity detector decision as to the presence of a source sound, the noise spectral covariance matrix $R_n$ 204 is adapted at every frequency. For example, as:

$$R_n^{updated}(\omega) = \begin{cases} R_n^{previous}(\omega) & \text{if } VAD = 1 \\ (1-\beta)R_n^{previous}(\omega) + \beta X(\omega)X^*(\omega) & \text{if } VAD = 0 \end{cases}$$

where $\beta$ is the noise learning rate, and $X(\omega)$ is the vector $X = [X^1 X_2 X_3]^T$ of the components in the windowed Fourier transform.

The source signal spectral power $R_s$ 205 is estimated by a spectral subtraction method. For example:

$$R_s = \begin{cases} R_{x;11} - R_{n;11} & \text{if } R_{x;11} \geq \beta_{SS} R_{n;11} \\ (\beta_{SS} - 1)R_{n;11} & \text{if otherwise} \end{cases}$$

where $\beta_{SS} > 1$ is a coefficient. Various spectral subtraction methods can be used, these are known in art, for example, IEEE Transactions on Acoustics, Speech and Signal Processing, vol. ASSP 27, No. 2, April 1979, Steven Boll, Suppression of Acoustic Noise in Speech Using Spectral Subtraction, pp. 113–120.

The differential microphone array filter 206, Filter2, Filters the measured signals $x_D$. For example, for the three-microphone array, the measured signals $x_1, x_2, x_3$ are filtered by the differential microphone array filter using the aligned signal. According to an embodiment of the present invention, $\tau_1, \tau_2$ are obtained as the solution of the optimization problem:

$$(\tau_1, \tau_2) = \text{argmax}_{d_1, d_2} I(d_1, d_2) \quad \quad 5$$

where the criterion $I(d_1, d_2)$ takes into account the following variables: $v = [1 - e^{i\omega d_1} - e^{i\omega d_2} e^{i\omega(d_1+d_2)}]$, $\delta$ is obtained in the direction of arrival estimations, $R_s(\omega)$ is a signal spectral power, and $R_{ns}(\omega)$ is a noise spectral covariance matrix. This criterion represents a generalization of the directivity index.

Referring again to FIG. 3, a system according to an embodiment of the present invention comprises an array of close-by microphones 301; the distance between any two adjacent microphones is about 1 cm. Amplifiers 302 and A/D converters 303 are provided in series, one of each for each microphone. A digital processor 304 is coupled to the A/D converters 303. A D/A converter 305 is coupled to the digital processor 304. An amplifier 306 and loudspeaker 307 can be provided, coupled in series from the D/A converter 305.

The direction of arrival estimation can be done less frequently than the differential microphone array filtering; more specifically, the differential microphone array filtering is done at the sampling rate of the digitized signal. The frequency of the direction of arrival estimation depends on the processing power of the digital processor, and can be done after every M samples, or after a longer time. Fractional delay parameters of the differential microphone array filter are determined on-line and the solutions for the fractional delay parameters for each estimated direction of arrival are stored in a look-up table. The aligned signal is determined less frequently than the differential microphone array filtering. As in the direction of arrival based adaptive differential microphone array scheme, in the voice activity detector and direction of arrival based adaptive differential microphone array scheme the differential microphone array filtering is done at the sampling rate, whereas the direction of arrival estimation and voice activity detector decision depend on the processing power of the digital processor, and can be done after every M samples, or after a longer time. The aligned signal is determined on a grid in $d_1, d_2$ parameters space with a resolution depending on the processing power available; a step size is about 0:01 per sample. The fractional delays are implemented by FIR (Finite Impulse Response) filters.

The differential microphone array can be implemented in the filter bank approach.

Having described embodiments for an adaptive multisensor array and method, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. An adaptive differential microphone array method comprises:
    receiving a signal;
    estimating a measured signal spectral covariance matrix of the signal;
    estimating a direction of arrival of the signal;
    determining a presence of a source of interest in the signal based on the direction of arrival of the signal, a noise spectral covariance matrix of the signal, and a source signal spectral power of the signal;
    estimating the noise spectral covariance matrix based on a determination of the presence of the source of interest and the measured signal spectral covariance matrix of the signal;
    estimating a source signal spectral power of the signal according to the presence of the source of interest the noise spectral covariance matrix and the noise spectral covariance matrix; and
    applying a differential microphone array filter to signal according to the direction of arrival, the noise spectral covariance matrix, and the source signal spectral power of the signal,
    wherein the noise spectral covariance matrix is adapted based on the presence of the source of interest over time.

2. The method of claim 1, wherein the signal is a sample.

3. The method of claim 1, further comprising:
    determining a fractional delay; and
    applying the fractional delay in the differential microphone array filter.

4. The method of claim 3, wherein determining the two fractional delays further comprises determining $(\tau_1, \tau_2) = \text{argmax}_{d_1, d_2} I(d_1, d_2)$, wherein $\tau_1, \tau_2$ are optimized values of the signal corresponding to the signal received at the microphone array $d_1, d_2$, and criterion $I(d_1, d_2)$ is a generalization of a directivity index.

5. The method of claim 1, wherein the differential microphone array filter suppresses directions including noise, amplifies directions including the source of interest, and determines an optimization for directions including both noise and the source of interest.

6. A digital processor for reducing a noise portion of a signal comprising:
    means for estimating a measured signal spectral covariance matrix of the signal;
    means for estimating a direction of arrival of the signal;
    a voice activity detector outputting a signal indicating the presence of a source of interest in the signal;
    means for estimating a noise spectral covariance matrix based on the signal indicating the presence of a source of interest in the signal and the measured signal spectral covariance matrix, and adapting the estimate of the noise spectral covariance matrix based on the presence of a source of interest in the signal at different frequencies;
    means for estimating a source signal spectral power of the signal according to the noise spectral covariance matrix, and the measured signal spectral covariance matrix; and
    a differential microphone array filter.

7. A program storage device readable by computer, tangibly embodying a program of instructions executable by the computer to perform method steps for an adaptive differential microphone array method, wherein said method steps comprising:
    receiving a signal;
    estimating a measured signal spectral covariance matrix of the signal;
    estimating a direction of arrival of the signal;
    determining a presence of a source of interest in the signal based on the direction of arrival of the signal, a noise spectral covariance matrix of the signal, and a source signal spectral power of the signal;
    estimating the noise spectral covariance matrix based on a determination of the presence of the source of interest and the measured signal spectral covariance matrix of the signal;

estimating a source signal spectral power of the signal according to the presence of the source of interest the noise spectral covariance matrix and the noise spectral covariance matrix; and applying a differential microphone array filter to signal according to the direction of arrival, the noise spectral covariance matrix, and the source signal spectral power of the signal.

8. The method of claim 7, wherein the signal is a sample.

9. The method of claim 7, further comprising:
determining a fractional delay; and
applying the fractional delay in the differential microphone array filter.

10. The method of claim 9, wherein determining the two fractional delays further comprises determining $(\tau_1,\tau_2)$=argmax$_{d_1,d_2}$ $I(d_1,d_2)$, wherein $\tau_1,\tau_2$ are optimized values of the signal corresponding to the signal received at the microphone array $d_1,d_2$, and criterion $I(d_1,d_2)$ is a generalization of a directivity index.

11. The method of claim 7, wherein the differential microphone array filter suppresses directions including noise, amplifies directions including the source of interest, and determines an optimization for directions including both noise and the source of interest.

* * * * *